United States Patent
Cheung et al.

(10) Patent No.: US 7,058,870 B2
(45) Date of Patent: *Jun. 6, 2006

(54) METHOD AND APPARATUS FOR ISOLATING FAULTY SEMICONDUCTOR DEVICES IN A MULTIPLE STREAM GRAPHICS SYSTEM

(75) Inventors: Tyvis C. Cheung, Sunnyvale, CA (US); Nathaniel D. Naegle, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/267,761

(22) Filed: Oct. 9, 2002

(65) Prior Publication Data

US 2004/0073857 A1  Apr. 15, 2004

(51) Int. Cl.
*G01R 31/28* (2006.01)
(52) U.S. Cl. .................. 714/732; 714/733; 714/738
(58) Field of Classification Search ................ 714/732, 714/733, 738, 739
See application file for complete search history.

(56) References Cited

U.S. PATENT DOCUMENTS

| | | | |
|---|---|---|---|
| 5,195,050 A * | 3/1993 | Hsu et al. .................... 708/420 |
| 5,694,401 A * | 12/1997 | Gibson ........................ 714/728 |
| 6,272,653 B1 * | 8/2001 | Amstutz ...................... 714/724 |
| 2003/0048276 A1 | 3/2003 | Wasserman et al. |
| 2003/0164835 A1 | 9/2003 | Burk et al. |
| 2004/0015760 A1 | 1/2004 | Naegle et al. |
| 2004/0073858 A1 * | 4/2004 | Cheung ...................... 714/732 |
| 2004/0088638 A1 * | 5/2004 | Cheung ...................... 714/774 |

\* cited by examiner

*Primary Examiner*—Joseph D. Torres
(74) *Attorney, Agent, or Firm*—Meyertons Hood Kivlin Kowert & Goetzel, P.C.; B. Noël Kivlin

(57) ABSTRACT

A method and an apparatus are provided for isolating faulty semiconductor devices in a multiple stream graphics system. The apparatus includes a buffer adapted to receive a plurality of data streams. The apparatus further includes a convolver comprising at least one convolution signature register; a router adapted to route the data streams from the buffer to the convolver, wherein the router comprises at least one router signature register; and an analyzer adapted to access the convolution and router signature registers, wherein the analyzer is capable of isolating at least one of a faulty semiconductor device and a faulty interconnection using the contents of the convolution and router signature registers.

33 Claims, 6 Drawing Sheets

METHOD AND APPARATUS FOR ISOLATING FAULTY SEMICONDUCTOR DEVICES IN A MULTIPLE STREAM GRAPHICS SYSTEM

BACKGROUND OF THE INVENTION

1. Field of the Invention

This invention relates generally to computer hardware and, more particularly, to a method and apparatus for isolating faulty semiconductor devices in a multiple stream graphics system.

2. Description of the Related Art

In modem video graphics systems, streams of digital bits have taken the place of the traditional reel of celluloid film composed of individual still photographs. The laborious task of processing video data may now be done with the assistance of processors in the video graphics systems, which may be capable of working on multiple streams of data from a variety of sources at once. For example, a single video graphics system may receive streams of data from devices such as a digital camera, a graphics rendering device, a computer-assisted design program, and the like. The video graphics system may also provide post-processed video data to a variety of output devices, including video projectors, televisions, monitors, and the like.

Video graphics systems may include tens or hundreds of semiconductor devices designed to perform various functions. Like all complex semiconductor devices, the semiconductor devices in the video graphics system may occasionally have intrinsic defects that cause the video graphics system to operate in an undesirable manner. The semiconductor devices may also become faulty during operation of the video graphics system. Even a single faulty semiconductor device can cause the video graphics system to operate in an incorrect or undesirable manner, so it is desirable to isolate faults to a single failing semiconductor device.

However, the increasing complexity of video graphics systems, and corresponding decreasing size of their semiconductor elements, has made it increasingly difficult to test the video graphics system. Simply observing the screen output of the video graphics system may reveal undesirable operation, but it may not be a sensitive enough test to detect some errors in high resolution video outputs. Nor may observing the screen provide any indication of which semiconductor device may be faulty. External test equipment like logic analyzers, logic probes and/or oscilloscopes may also have limited usefulness as the size of the semiconductor components continues to decrease.

In recent years, signature analysis using signature registers included in the video graphics system has been developed to provide reliable indications of the correct operation of digital systems. However, trying to isolate faults down to a single component level using signature registers is difficult when there are, for example, 92 semiconductor devices involved in the video graphics system where no signature registers can be put into 64 of the semiconductor devices.

The problems are exacerbated when more than one video stream is provided to the video graphics system. Data from the multiple video streams generally travels through the same data path in the video graphics system, but the data streams may be asynchronous. For example, depending on the particular processing operations, processing of one frame from one data stream may finish while the processing of another frame may only be halfway done. The order in which bits from the multiple video streams may be processed may also not be deterministic. Signature registers typically only work when signature analyzing deterministic data from one video stream or synchronous data from multiple video streams.

SUMMARY OF THE INVENTION

In one aspect of the present invention, a method is provided for isolating faulty semiconductor devices in a multiple stream graphics system. The apparatus includes a buffer adapted to receive a plurality of data streams. The apparatus further includes a convolver comprising at least one convolution signature register; a router adapted to route the data streams from the buffer to the convolver, wherein the router comprises at least one router signature register; and an analyzer adapted to access the convolution and router signature registers, wherein the analyzer is capable of isolating at least one of a faulty semiconductor device and a faulty interconnection using the contents of the convolution and router signature registers.

In another aspect of the instant invention, a method is provided for isolating faulty semiconductor devices in a multiple stream graphics system. The method includes providing a test pattern to a buffer via a plurality of data streams, wherein the buffer is coupled to a router and a convolver. The method further includes accessing a plurality of signature registers in the router and the convolver and detecting at least one of a faulty semiconductor device and a faulty interconnection using the contents of the plurality of signature registers.

BRIEF DESCRIPTION OF THE DRAWINGS

The invention may be understood by reference to the following description taken in conjunction with the accompanying drawings, in which like reference numerals identify like elements, and in which.

Figure 1:
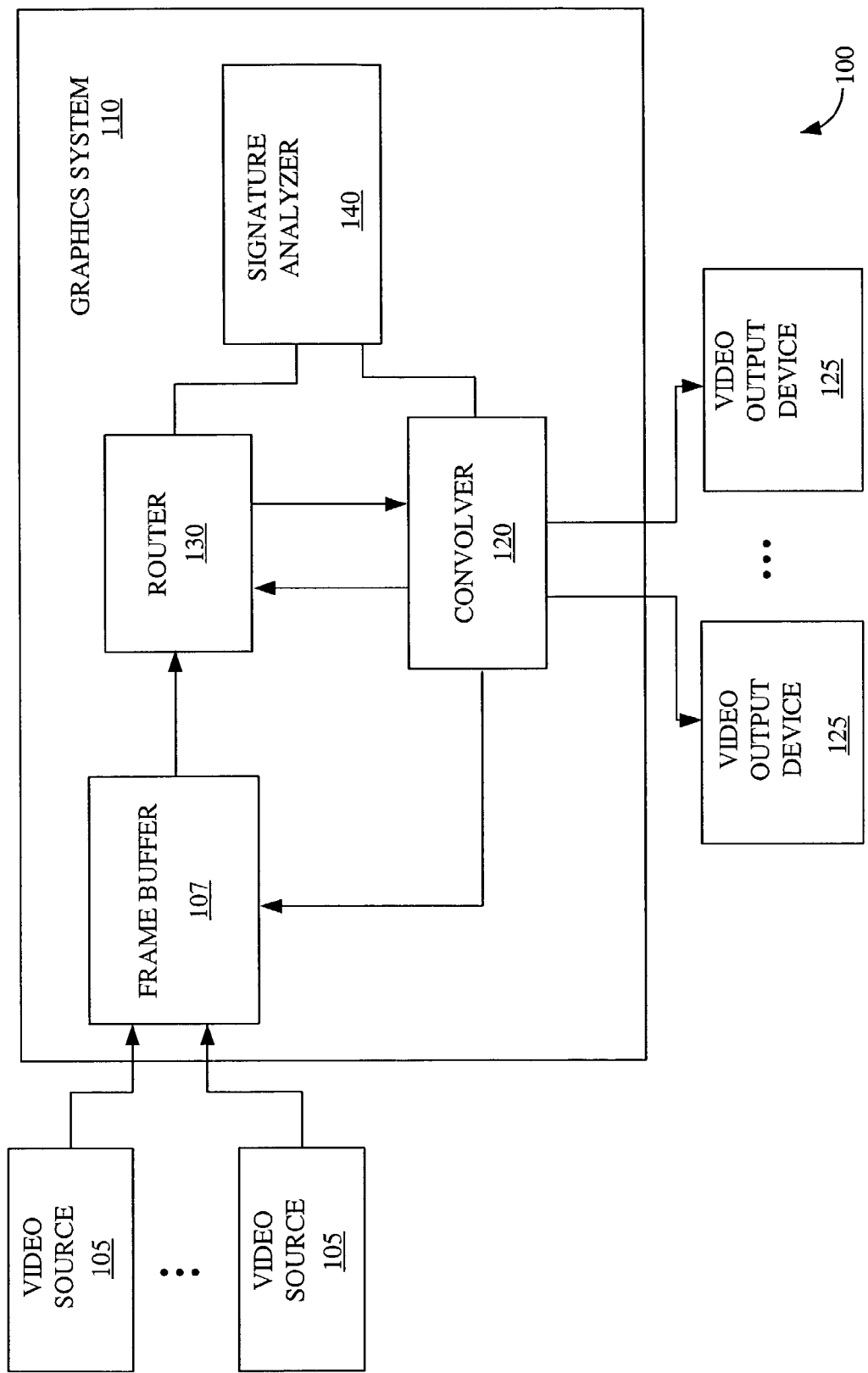
FIG. 1 shows a block diagram of a system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a block diagram showing a system 100 in accordance with one embodiment of the present invention is illustrated. The system 100 may include one or more video sources 105 such as a digital video camera, a graphics rendering device, and the like. The video source 105 may, in one embodiment, provide one or more video data streams to a frame buffer 107 in a graphics system 110 such as a Sun Microsystems video graphic system. The video data streams may comprise a plurality of frames (not shown) formed of a plurality of bits. In one embodiment, each one of the plurality of frames may be formed of approximately 50 million bits. In alternative embodiments, each frame may be formed of more or fewer bits. In one embodiment, the frame buffer 107 may store the video data from the one or more video streams.

A convolver 120 may be used by the graphics system 110 to process the data in the video data streams and provide a signal that may be used by one or more video output devices 125 to produce an image. Although not so limited, the video output devices 125 may include such devices as a television, a video projection device, a monitor, and the like. The convolver 120 may, in one embodiment, transmit requests to the frame buffer 107, which may provide data from the one or more video data streams to a router 130 in response to the request. The router 130 may then direct the video data to the convolver 120.

The frame buffer 107, the convolver 120, the router 130, and other desirable elements of the graphics system 110 may include a plurality of semiconductor devices that may perform various functions. The semiconductor devices may be defective when installed, or they may fail during operation of the graphics system 110. Hereinafter, a semiconductor device which may be defective or may cause the graphics system 110 to operate in an incorrect or undesirable manner will be referred to as a "faulty semiconductor device." Thus, in accordance with one embodiment of the present invention, the graphics system 110 may comprise a signature analyzer 140 that may be capable of detecting and isolating one or more faulty semiconductor devices.

The signature analyzer 140 may, in one embodiment, be coupled to the router 130 and the convolver 120. Signature data from a plurality of signature registers in the router 130 and the convolver 120 may be provided to the signature analyzer 140. In one embodiment, the signature data may be provided to the signature analyzer 140 in series using the Joint Test Action Group (JTAG) protocol, also known as the Institute of Electrical and Electronics Engineers (IEEE) Standard 1149.1, entitled "Standard test access port and boundary scan architecture." As described in more detail below, the signature analyzer 140 may use the signature data from the convolver 120 and the router 130 to detect and isolate one or more faulty semiconductor devices.

Figure 2A:
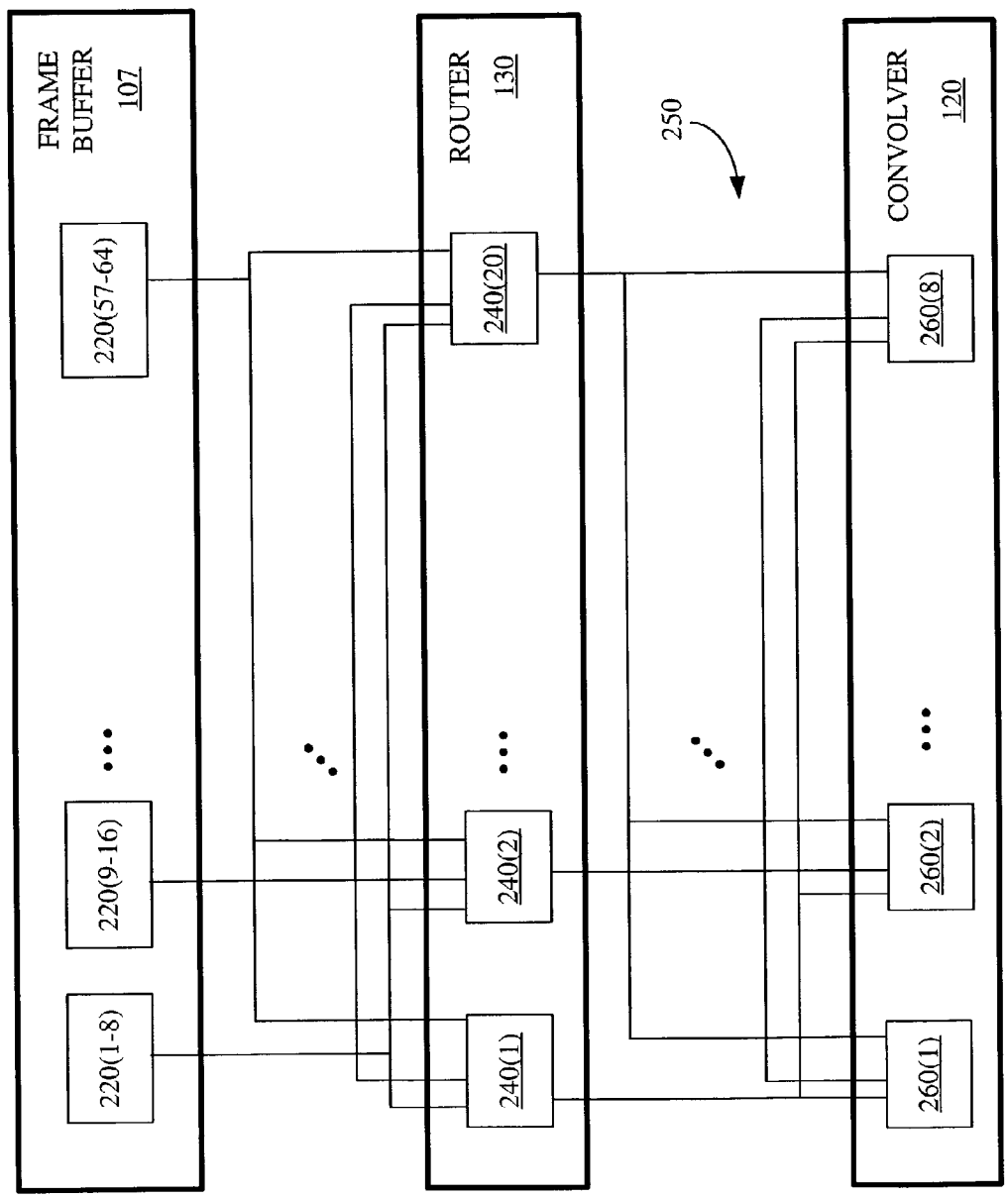
FIGS. 2A–B show block diagrams illustrating an exemplary configuration of a frame buffer, a router, and a convolver that may be used in the graphics system shown in FIG. 1, in accordance with one embodiment of the present invention.

Referring now to FIG. 2A, a block diagram illustrating an exemplary arrangement of the frame buffer 107, the convolver 120, and the router 130 that may be used in the graphics system 110 is shown. The frame buffer 107 may include a plurality of frame buffer elements 220(1–64). In one embodiment, the frame buffer elements 220(1–64) may not include signature registers. In the interest of clarity, FIG. 2A shows one embodiment of the frame buffer 107 that includes 64 frame buffer elements 220(1–64). However, it should be appreciated that, in alternative embodiments, more or fewer frame buffer elements 220(1–64) may be deployed in the frame buffer 107 without deviating from the scope of the present invention. In one embodiment, each of the 64 frame buffer elements 220(1–64) may output 20 bits of video data. Thus, the frame buffer 107 may provide 1280 bits to the other components of the graphics system 110. It should, however, be appreciated that, in alternative embodiments, more or fewer bits may be output by the frame buffer elements 220(1–64) without deviating from the scope of the present invention.

The frame buffer elements 220(1–64) may be divided into one or more groups. In one embodiment, the 64 frame buffer elements 220(1–64) may be divided into 8 groups of 8 frame buffer elements 220(1–8), 220(9–16), . . . 220(57–64), as indicated in FIG. 2A. However, it should be appreciated that, in alternative embodiments, the frame buffer elements 220(1–64) may be divided into more or fewer groups having more or fewer frame buffer elements 220(1–64). In one embodiment, each of the video data streams may be provided to separate groups of frame buffer elements 220(1–64). For example, if two video data streams are provided to the graphics system 110, a first video data stream may be provided to four groups including the 32 frame buffer elements 220(1–32) and a second video data stream may be provided to four groups including the 32 frame buffer elements 220(33–64).

Figure 2B:
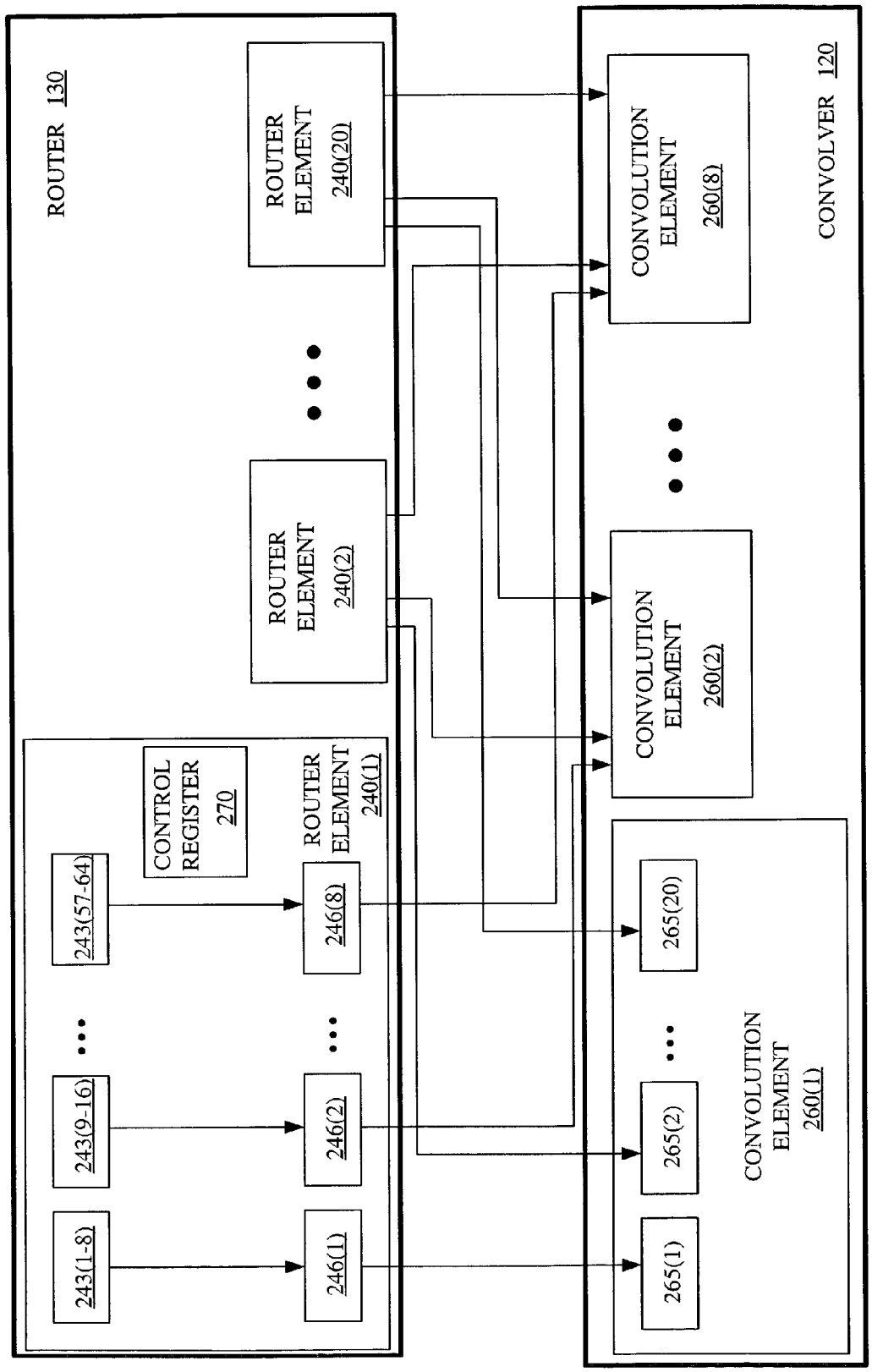

The frame buffer 107 may, in one embodiment, provide data to the router 130. The router 130 may, in one embodiment, include 20 router elements 240(1–20). Each of the 20 router elements 240(1–20) may have a plurality of input router signature registers 243(1–64), as shown in FIG. 2B, which may each analyze 1 bit of data. Thus, the router 130 may analyze 20×64×1=1280 bits from the frame buffer 107. However, it should be appreciated that, in alternative embodiments, more or fewer router elements 240(1–20) including more or fewer input router signature registers 243(1–64) capable of analyzing one or more bits may be used without deviating from the scope of the present invention. The input router signature registers 243(1–64) may be formed of 20-bit signature registers, so additional bits may be added to each of the input router signature registers 243(1–64). In one embodiment, the input router signature registers 243(1–64) may be a linear hybrid cellular automata (LHCA).

The bits of video data may be directed to the various input router signature registers 243(1–64) using any of a variety of suitable methods and/or devices. In one embodiment, the bits may be divided such that each of the 20 router elements 240(1–20) receives a respective one of the 20 bits from each of the 64 corresponding frame buffer elements 220(1–64). For example, a first bit in the first frame buffer element 220(1) may be routed to the first input router signature register 243(1) and a second bit in the first frame buffer element 220(1) may be routed to the second input router signature register 243(2). For another example, a first bit in the second frame buffer element 220(2) may be routed to the first input router signature register 243(1) and a second bit in the second frame buffer element 220(2) may be routed to the second input router signature register 243(2). Thus, each input router signature register 243(1–64) may be provided with one bit from each of the frame buffer elements 220 (1–64). Although not so limited, bits from a single group of frame buffer elements 220(1–64) may be provided to the corresponding input router signature registers 243(1–64). For example, in FIG. 2B, the input router signature registers 243(1–64) in the block labeled 243(1–8) may be provided with the first bit from each of the frame buffer elements 220(1–64) in the first group of 8 frame buffer elements 220(1–8).

Each of the router elements 240(1–20) may also have a plurality of 8-bit output router signature registers 246(1–8). In one embodiment, the input router signature registers 243(1–64) may provide 8×8×20=1280 bits to the 8-bit output router signature registers 246(1–8) in the 20 router elements 240(1–20). However, it should be appreciated that, in alternative embodiments, more or fewer output router signature registers 246(1–8) capable of analyzing more or fewer than 8 bits may be used without deviating from the scope of the present invention. In one embodiment, the output router signature registers 246(1–8) may be formed from LHCAs. The 8-bit output router signature registers 246(1–8) may, in one embodiment, each be provided with bits from a single group. For example, the input router signature registers 243(1–8) may provide 8 bits to the 8-bit output signature register 246(1) and the input router signature registers 243(9–16) may provide 8 bits to the 8-bit output signature register 246(2).

The router 130 may route the bits of video data to the convolver 120 using a plurality of interconnections 250. In various alternative embodiments, the interconnections 250 may be traces, wires, and the like. The convolver 120 may be capable of post-processing the at least one video data stream provided by the at least one video source 105 and sending the post-processed video data to other portions of the system 100 of which the graphics system 110 may be a part, such as the video output devices 125 shown in FIG. 1. The convolver 120 may, in one embodiment, include a plurality of convolution elements 260(1–8), as shown in FIG. 2B, which may include a plurality of 8-bit input convolution signature registers 265(1–20). Thus, the convolver 120 may be capable of receiving 8×20×8=1280 bits from the router 130. It should, however, be appreciated that, in alternative embodiments, more or fewer convolution elements 260(1–8) including more or fewer input convolution signature registers 265(1–20) capable of analyzing more or fewer than 8 bits may be used without deviating from the scope of the present invention. In various illustrative embodiments, the input convolution signature registers 265 (1–20) may be formed from LHCAs.

In one embodiment, the router 130 may provide the bits from each group of frame buffer elements 220(1–64) to each of the input convolution signature registers 265(1–20). For example, the output router signature register 246(1) on the router element 240(1) may provide the first bits from each of the first group of frame buffer elements 220(1–8) to the input convolution signature register 265(1) on the convolution element 260(1). Similarly, the output router signature register 246(2) on the router element 240(1) may provide the first bits from each of the second group of frame buffer elements 220(9–16) to the convolution element 260(2). For another example, the router element 240(2) may provide the second bits from each of the first group of frame buffer elements 220(1–8) to the input convolution signature register 265(2) on the convolution element 260(1) and the router element 240(20) may provide the twentieth bits from each of the first group of frame buffer elements 220(1–8) to the input convolution signature register 265(20) on the convolution element 260(1). Thus, each convolution element 260(1–8) may, in one embodiment, receive the video data from one group of frame buffer elements 220(1–64) and, consequently, may perform the post-processing on one of the at least one video streams at a time. The router 130 may also include a control register 270, which may store data that indicates which of the one or more video streams are being processed by which output router signature registers 246 (1–8) and which convolution elements 260(1–8).

Figure 3:
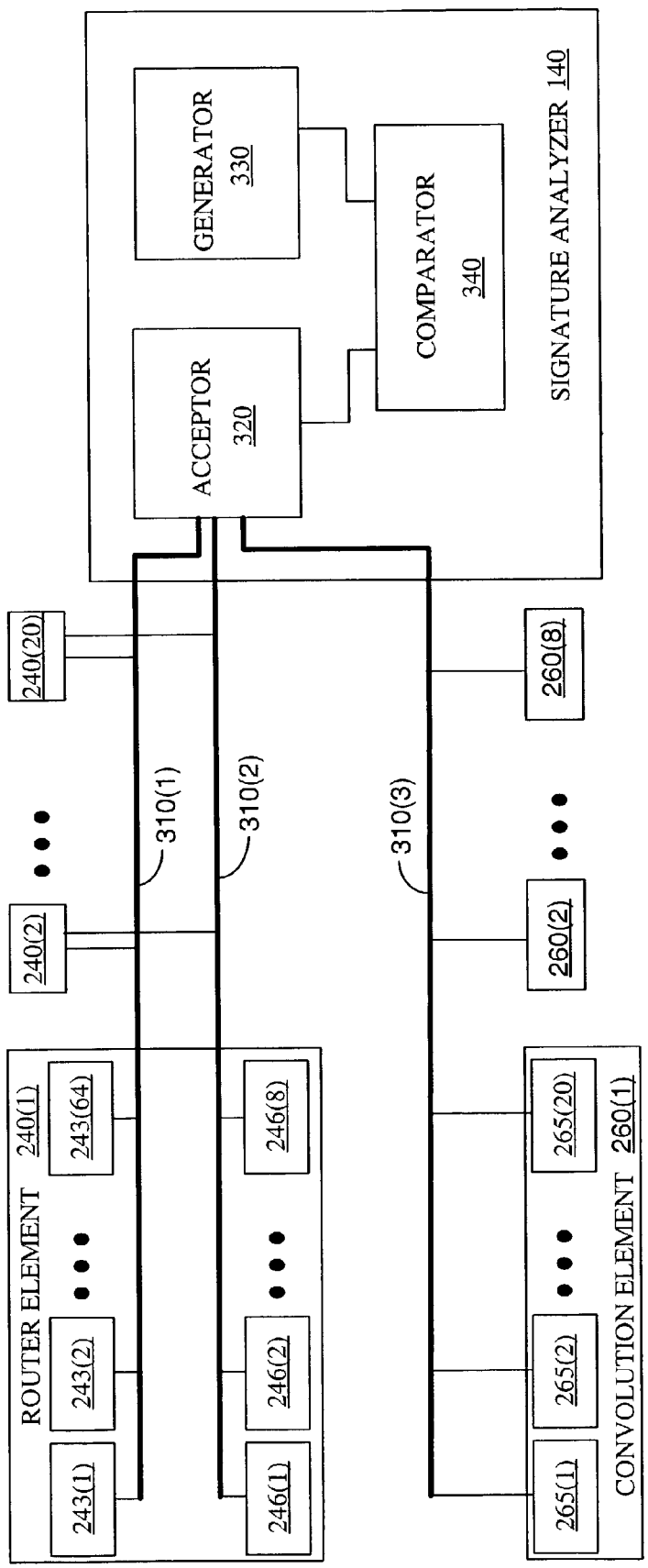
FIG. 3 shows a block diagram of a signature analyzer that may be used in the graphics system depicted in FIGS. 2A–B, in accordance with one embodiment of the present invention.

FIG. 3 shows a block diagram of the signature analyzer 140 that may be used in the graphics system 110. The signature analyzer 140 may, in one embodiment, be coupled to one or more serial buses 310(1–3). For example, the signature analyzer 140 may be coupled to three serial buses 310(1–3), which may be coupled to the input router signature registers 243(1–64) on the router elements 240(1–20), the output router signature registers 243(1–64) on the router elements 240(1–20), and the input convolution signature registers 265(1–20) on the convolution elements 260(1–8). In one embodiment, data from the signature registers 243 (1–64), 246(1–8), 265(1–20) may be provided to the signature analyzer 140 in series via the serial buses 310(1–3) using the Joint Test Action Group (JTAG) protocol, also known as the Institute of Electrical and Electronics Engineers (IEEE) Standard 1149.1, entitled "Standard test access port and boundary scan architecture." The JTAG Standard provides a serial bus standard that may be used to implement a general purpose hardware configuration, initialization, and status bus. However, it should be appreciated that, in alternative embodiments, an Inter-IC (I2 C) serial bus, a serial PCI bus, or any other standard or proprietary bus well known to those of ordinary skill in the art may be used by the serial buses 310(1–3) in the graphics system 10.

The serial buses 310(1–3) may be coupled to an acceptor 320. In one embodiment, the bits in the signature registers 243(1–64), 246(1–8), 265(1–20) may be provided serially to the acceptor 320 via the serial buses 310(1–3), and the acceptor 320 may use the bits to form a plurality of signatures by any of a variety of suitable methods and/or devices. For example, the acceptor 320 may form a calculated signature from the bits in the input router signature register 243(1) by performing a binary addition of all the bits. For another example, the acceptor 320 may form a calculated signature from the bits in the input router signature register 243(1) by performing an exclusive-OR operation on adjacent bits. Hereinafter, the signatures that may be calculated by the acceptor 320 using the bits in the signature registers 243(1–64), 246(1–8), 265(1–20) are referred to as the "calculated signatures."

The signatures that may be formed by the acceptor 320 using signature data from the signature registers 243(1–64), 246(1–8), 265(1–20) may depend upon the video data that may be provided to the frame buffer 107. Consequently, if a predetermined test pattern is provided to the frame buffer 107, the signatures that should be calculated during normal operation of the acceptor 320 may be determined in advance. Although not so limited, the test pattern may include such geometric shapes as triangles, squares, circles, or any other desirable shape or combinations thereof. Hereinafter, the signatures that may be calculated in advance using the predetermined test pattern are referred to as the "predetermined signatures." In accordance with one embodiment of the present invention, a generator 330 may be provided to determine the predetermined signatures. Although not so limited, in one embodiment, the generator 330 may be one or more processors running one or more software applications.

The acceptor 320 may be coupled to a comparator 340 and may provide the calculated signatures to the comparator 340. Similarly, the generator 330 may provide the predetermined signatures to the comparator 340, which may compare the calculated signatures to the predetermined signatures. If the frame buffer 107, the router 130, the convolver 120, the interconnections 250 and any other components that it may be desirable to include in the graphics system 110 are operating correctly, the predetermined signatures may be substantially the same as the calculated signatures. However, if the predetermined signatures are not substantially the same as the calculated signatures, it may indicate that one or more components in the graphics system 110 may be faulty. By comparing the calculated and predetermined signatures, the comparator 340 may be capable of detecting and isolating one or more faulty components in the graphics system 110.

In one embodiment, the one or more video sources 105 may provide a single video data stream to the graphics system 110. The comparator 340 may then use the calculated signatures of the input router signature registers 243(1–64) in the router elements 240(1–20) to detect and isolate one or more faulty frame buffer elements 220(1–2). For example, if the calculated signature for the input router signature register 243(1) in the router element 240(1) does not substantially match the predetermined signature, the comparator 340 may determine that the frame buffer element 220(1) may be faulty.

Similarly, the comparator 340 may use the calculated signatures of the output router signature registers 246(1–8) and/or the input convolution signature registers 265(1–20) to determine if one or more of the router elements 240(1–20) or convolution elements 260(1–8) may be faulty. For example, if the calculated signature for the input router signature register 243(1) in the router element 240(1) substantially matches the predetermined signature, but the calculated signature for the output router signature register 246(1) in the router element 240(1) does not substantially match the predetermined signature, the comparator 340 may determine that the router element 240(1) may be faulty.

Furthermore, the comparator 340 may use the calculated signatures of the output router signature registers 246(1–8) and the input convolution signature registers 265(1–20) to determine if one or more of the interconnections 250 may be faulty. For example, if the calculated signature for the output router signature register 246(1) in the router element 240(1) substantially matches the predetermined signature, but the calculated signature for the input convolution signature register 265(1) in the convolution element 260(1) does not substantially match the predetermined signature, the comparator 340 may determine that one or more of the plurality of interconnections 250 may be faulty.

However, the one or more video sources 105 may provide more than one video data stream to the graphics system 110. In one embodiment, the video data streams may be provided to the frame buffer elements 220(1–64) asynchronously or in an otherwise non-deterministic manner. The more than one video data streams may, in one embodiment, be provided to different groups of frame buffer elements 220(1–64) that may provide video data to substantially all the input router signature registers 243(1–64). Thus, the video data in the input router signature registers 243(1–64) may not be deterministically ordered and the signature analyzer 140 may not be capable of determining which of the frame buffer elements 220(1–64) may be faulty, as will be appreciated by those of ordinary skill in the art.

In accordance with one embodiment of the present invention, each of the output router signature registers 246(1–8) in the router element 240(1) and each of the input convolution signature registers 265(1–20) may be provided with data from one of the one or more video data streams. For example, the output router signature register 246(1) may be provided with the video data stream that may be provided to the first group of frame buffer elements 220(1–8). Consequently, the video stream data may be provided to the output router signature registers 246(1–8) and the input convolution signature registers 265(1–20) in a synchronous or otherwise deterministic manner such that the signature analyzer 140 may detect and isolate one or more faulty frame buffer elements 220(1–64).

Figure 4:
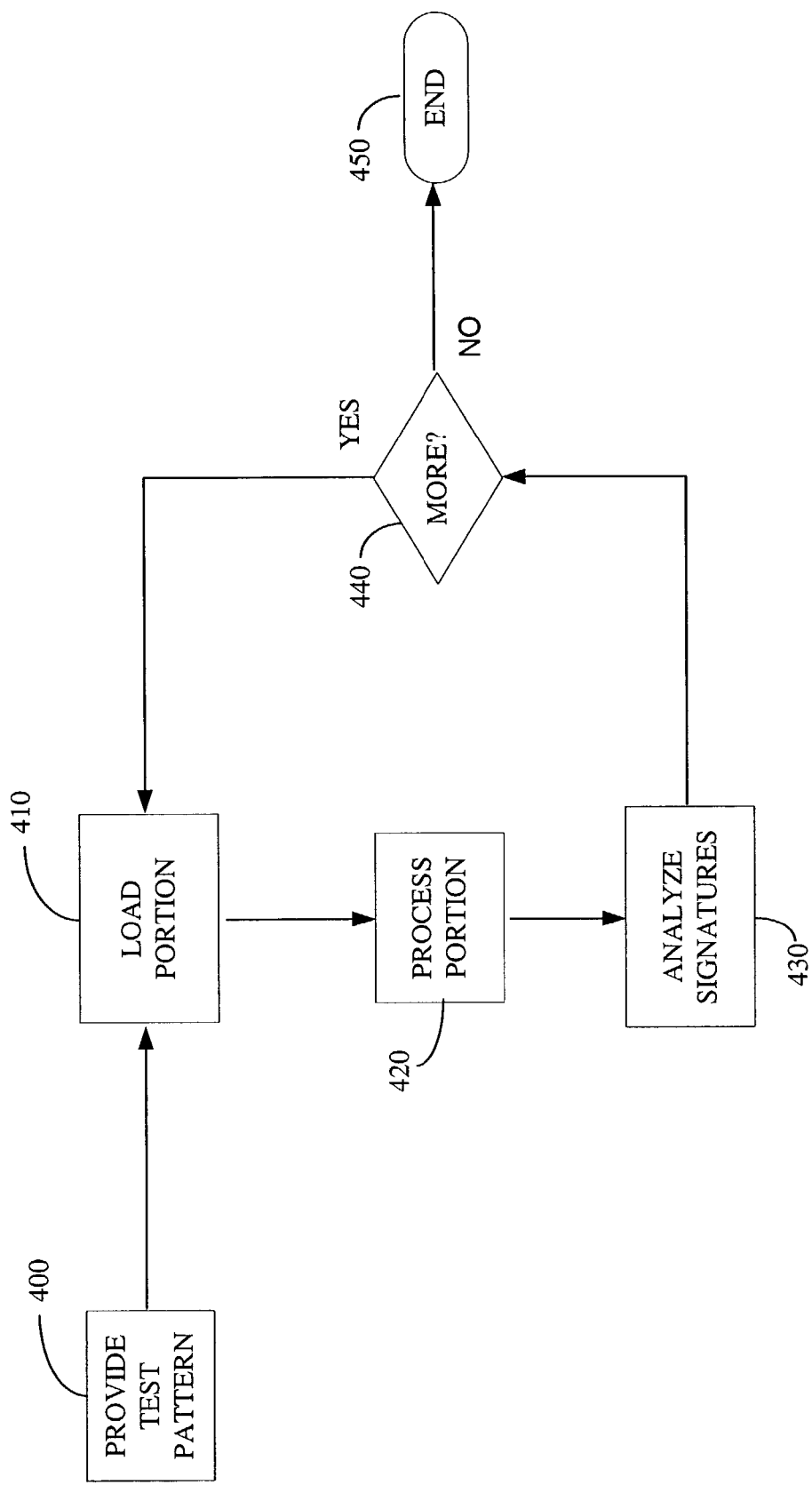
FIG. 4 shows a flow diagram illustrating a method that may be used for detecting faulty semiconductor devices in the graphics system depicted in FIGS. 2A–B.

Referring now to FIG. 4, a flow diagram illustrating a method of detecting and isolating one or more faulty semiconductor devices and/or interconnections 250 in the graphics system 110 is shown. A test pattern may be provided (at 400) to the frame buffer 107. Although not so limited, the test pattern may include such geometric shapes as triangles, squares, circles, or any other desirable shape or combinations thereof. In one embodiment, the test pattern may be provided (at 400) via one or more data streams in an asynchronous or non-deterministic manner. In response to a signal from the convolver 120, a portion of the test pattern may be loaded (at 410) into the frame buffer elements 220(1–64), which may provide the portion to the router 130 and the convolver 120. The convolver 120 may process (at 420) the portion and provide a signal to the one or more video output devices 125.

In accordance with one embodiment of the present invention, and as described in more detail below, the signature analyzer 140 may analyze (at 430) signatures formed from the contents of the input router signature registers 243 (1–64), the output router signature registers 246(1–8), the input convolution signature registers 265(1–20), and any other signature registers that it may be desirable to include in the graphics system 110. If it is determined (at 440) that portions of the test pattern may not have been analyzed, the convolver 120 may transmit a signal to the frame buffer 107 requesting more data. If not, the signature analysis may end (at 450).

Figure 5:
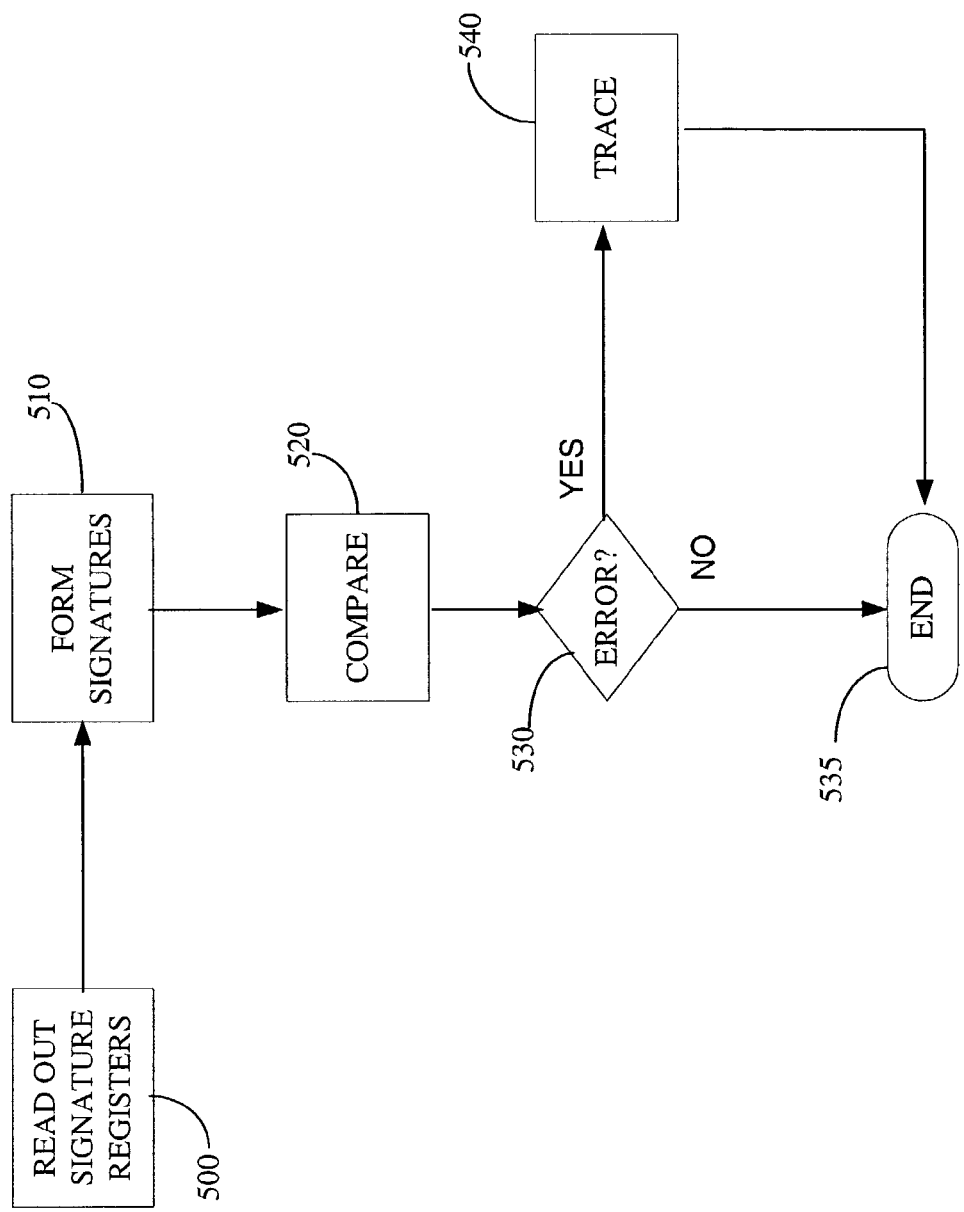
FIG. 5 shows a flow diagram illustrating a method of analyzing signatures that may be used by the signature analyzer shown in FIG. 3 to detect and isolate faulty semiconductor devices in the graphics system shown in FIG. 1, in accordance with one embodiment of the present invention.

Referring now to FIG. 5, a flow diagram illustrating a method of analyzing signatures is shown. The signature analyzer 140 may read out (at 500) the contents of the input router signature registers 243(1–64), the output router signature registers 246(1–8), the input convolution signature registers 265(1–20), and any other signature registers that it may be desirable to include in the graphics system 110. Although not so limited, in one embodiment, the signature analyzer 140 may read out (at 500) the contents in series using the Joint Test Action Group (JTAG) protocol, also known as the Institute of Electrical and Electronics Engineers (IEEE) Standard 1149.1, entitled "Standard test access port and boundary scan architecture."

The acceptor 320 may use the read-out contents to form (at 510) one or more calculated signatures by a variety of means well know to those of ordinary skill in the art. The generator 330 may use the test pattern to form (at 510) one or more predetermined signatures. In one embodiment, one calculated signature and one predetermined signature may be formed for each bit in each signature register 243(1–64), 246(1–8), 265(1–20). However, it should be appreciated that, in alternative embodiments, more or fewer calculated and predetermined signatures may be formed without deviating from the scope of the present invention.

The comparator 340 may then compare (at 520) the calculated signature to the corresponding predetermined signature. If the comparator 340 determines (at 530) that substantially all of the calculated signatures are substantially equal to the corresponding predetermined signatures, indicating that substantially all the semiconductor devices and/or interconnections 250 in the graphics system 110 may be operating in a desirable manner, the signature analysis may end (at 535). However, if the comparator determines (at 530) that one or more calculated signatures are not substantially equal to the corresponding predetermined signatures, indicating that one or more semiconductor devices and/or interconnections 250 in the graphics system 110 may be faulty, the signature analyzer 140 may trace (at 540) the error, as described above, after which the signature analysis may end (at 535).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. An apparatus, comprising:
  a plurality of semiconductor devices coupled by a plurality of interconnects;
  a buffer adapted to receive a plurality of data streams;
  a convolver, coupled to the buffer comprising at least one convolution signature register;
  a router coupled between the buffer and the convolver and adapted to selectively route a first group of bits of the plurality of data streams and a second group of bits of the plurality of data streams from the buffer to one or more of a plurality of convolution elements comprised in the convolver, wherein the router comprises at least one router signature register; and
  an analyzer, coupled to the convolver and adapted to access the convolution and router signature registers, wherein the analyzer is adapted to isolate at least one of a faulty semiconductor device and a faulty interconnection from among the plurality of semiconductor devices coupled by the plurality of interconnections using the contents of the convolution and router signature registers.

2. The apparatus of claim 1, wherein the buffer comprises a plurality of buffer elements, wherein each buffer element is adapted to store at least one bit from the plurality of data streams.

3. The apparatus of claim 2, wherein the plurality of buffer elements is divided into a plurality of groups, wherein the buffer elements in each group are adapted to store at least one bit from a selected one of the plurality of data streams.

4. The apparatus of claim 3, wherein the router comprises at least one signature register adapted to access the buffer elements.

5. The apparatus of claim 4, wherein the router comprises at least one output signature register adapted to access input signature registers corresponding to a selected group.

6. The apparatus of claim 5, wherein the router comprises a control register adapted to indicate which output signature registers are adapted to access the input signature registers corresponding to the selected group.

7. The apparatus of claim 6, wherein the convolver comprises at least one convolution element including at least one of the convolution signature registers.

8. The apparatus of claim 7, wherein the convolution signature register is adapted to access the output signature registers corresponding to the selected group.

9. The apparatus of claim 1, further comprising at least one video source coupled to the buffer and adapted to provide a test pattern to the buffer via the plurality of data streams.

10. The apparatus of claim 9, wherein the analyzer comprises at least one generator adapted to form at least one predetermined signature using the test pattern.

11. The apparatus of claim 1, wherein the analyzer comprises at least one acceptor adapted to form at least one calculated signature using the contents of the convolution and router signature registers.

12. The apparatus of claim 1, wherein the analyzer comprises a comparator adapted to isolate at least one faulty semiconductor device by determining if the calculated signature is substantially equal to the predetermined signature.

13. The apparatus of claim 1, wherein the faulty interconnection is at least one of a wire and a trace between the router and the convolver.

14. The apparatus of claim 1, wherein the faulty semiconductor device is in at least one of the buffer, the convolver, and the router.

15. A method comprising:
  providing a test pattern to a buffer via a plurality of data streams, wherein the buffer is coupled to a router and a convolver, wherein the router coupled between the buffer and the convolver and adapted to selectively route a first group of bits of the plurality of data streams and a second group of bits of the plurality of data streams from the buffer to one or more of a plurality of convolution elements comprised in the convolver;
  accessing a plurality of signature registers in the router and the convolver; and
  detecting at least one of a faulty semiconductor device and a faulty interconnection from among a plurality of semiconductor device coupled by a plurality of interconnections using the contents of the plurality of signature registers.

16. The method of claim 15, wherein accessing the plurality of signature registers comprises reading out the contents of the signature registers in series.

17. The method of claim 15, wherein detecting at least one of the faulty semiconductor device and the faulty interconnect comprises forming a calculated signature using the read-out contents of the signature registers.

18. The method of claim 17, wherein detecting the at least one of the faulty semiconductor device and the faulty interconnect comprises forming a predetermined signature using the test pattern.

19. The method of claim 18, wherein detecting at least one of the faulty semiconductor device and the faulty interconnect comprises determining if the calculated signature is substantially equal to the predetermined signature.

20. The method of claim 19, wherein detecting the at least one of the faulty semiconductor device and the faulty interconnect comprises isolating the at least one of the faulty semiconductor device and the faulty interconnect using the plurality of calculated and predetermined signatures.

21. The method of claim 15, wherein detecting the faulty semiconductor device comprises detecting the faulty semiconductor device in at least one of the buffer, the router, and the convolver.

22. The method of claim 15, wherein providing the test pattern via the plurality of data streams comprises providing the test pattern via the plurality of data streams in a non-deterministic manner.

23. A system, comprising:
at least one video source adapted to provide a test pattern non-deterministically to a buffer via a plurality of data streams;
a convolver adapted to process the plurality of data streams, wherein the convolver includes at least one signature register;
a router coupled between the buffer and the convolver and adapted to selectively route a first group of bits of the plurality of data streams and a second group of bits of the plurality of data streams from the buffer to one or more of a plurality of convolution elements comprised in the convolver, wherein the router comprises at least one router signature register;
an acceptor adapted to access the convolution and router signature registers and form at least one signature using the contents of the convolution and router signature registers;
a generator adapted to generate at least one predetermined signature using the test pattern; and
a comparator adapted to detect at least one of a faulty semiconductor device and a faulty interconnection from among a plurality of semiconductor device coupled by a plurality of interconnections by determining if the calculated signature is substantially equal to the predetermined signature.

24. The system of claim 23, wherein the router signature registers comprise at least one input signature register adapted to access the buffer.

25. The system of claim 24, wherein the router signature registers comprise at least one output signature register adapted to access the input signature registers.

26. The system of claim 25, wherein the convolution signature register, input router signature register and output router signature register are linear hybrid cellular automata.

27. The system of claim 23, wherein the faulty semiconductor device is in at least one of the buffer, the router, and the convolver.

28. The system of claim 23, wherein the generator comprises a processor.

29. The system of claim 28, wherein the processor is adapted to run software to generate the predetermined signature.

30. The system of claim 23, wherein the video source is a camera.

31. The system of claim 23, wherein the video source is a graphics rendering device.

32. The system of claim 23, wherein the faulty interconnection is at least one of a wire and a trace between the router and the convolver.

33. A device, comprising:
means for providing a plurality of data streams to a buffer;
means for accessing a plurality of bits in at least one router signature register on a router and at least one convolution signature registers on a convolver, wherein the router is adapted to selectively route a first group of bits of the plurality of data streams and a second group of bits of the plurality of data streams from the buffer to one or more of a plurality of convolution elements comprised in the convolver; and
means for detecting at least one of a faulty semiconductor device and a faulty interconnection from among a plurality of semiconductor devices coupled by a plurality of interconnections by forming at least one signature using the contents of the router and the convolution signature registers.

* * * * *